US012428905B2

(12) United States Patent
Graña Domínguez

(10) Patent No.: US 12,428,905 B2
(45) Date of Patent: Sep. 30, 2025

(54) FOLDING SUPPORT DEVICE FOR SMART DOORS

(71) Applicant: Daniel Graña Domínguez, Vigo (ES)

(72) Inventor: Daniel Graña Domínguez, Vigo (ES)

( * ) Notice: Subject to any disclaimer, the term of this patent is extended or adjusted under 35 U.S.C. 154(b) by 0 days.

(21) Appl. No.: 18/577,260

(22) PCT Filed: Jul. 4, 2022

(86) PCT No.: PCT/ES2022/070427
§ 371 (c)(1),
(2) Date: Jan. 7, 2024

(87) PCT Pub. No.: WO2023/281144
PCT Pub. Date: Jan. 12, 2023

(65) Prior Publication Data

US 2025/0012140 A1 Jan. 9, 2025

(30) Foreign Application Priority Data

Jul. 8, 2021 (ES) .......................... ES2021131435U

(51) Int. Cl.
*E06B 7/32* (2006.01)

(52) U.S. Cl.
CPC ...................................... *E06B 7/32* (2013.01)

(58) Field of Classification Search
CPC ................. E06B 7/32; E06B 7/34; E05F 1/00
See application file for complete search history.

(56) References Cited

U.S. PATENT DOCUMENTS 4,173,099 A * 11/1979 Robb ........................ E06B 7/32 49/168
6,560,926 B1 * 5/2003 Gillett ....................... E06B 7/32 49/362
7,984,695 B1 * 7/2011 Shaffer ..................... E06B 7/32 119/501
9,051,680 B1 * 6/2015 Harris ..................... D06F 57/12
9,885,444 B1 * 2/2018 Bongiorno ............. A47K 17/02
10,874,269 B2 * 12/2020 Bongiorno ............. F16M 11/24
(Continued)

OTHER PUBLICATIONS

International Search Report for PCT/ES2022/070427, Oct. 5, 2022, 2 pgs.

*Primary Examiner* — Ko H Chan
(74) *Attorney, Agent, or Firm* — Danielson Legal LLC

(57) ABSTRACT

A hinged support device for smart doors comprising:

a folding element (1) that can rotate between an inactive and an active position, a fastening element (2) which is fixed to the inside of the door leaf (A) and to which the folding element (1) is hinged at a first hinge point (3), and driving means (4) acting on the folding element (1) to cause it to rotate, wherein the driving means (4) comprise a rod (5) which can move linearly between the inactive and active positions, wherein the free end is connected to a first end of a first transmission element (6), the second end of which is hinged, at a second hinge point (7), to a first end of a second transmission element (8), the second end of which is hinged, at a third hinge point (9), to a middle section of the folding element (1), where the linear movement of the second hinge point (7) is limited by a first guide (10) comprising the fastening element (2) whose direction is parallel to the direction of movement of the rod (5) of the driving means (4).

4 Claims, 7 Drawing Sheets

(56) References Cited

U.S. PATENT DOCUMENTS

| | | | | |
|---|---|---|---|---|
| 11,832,751 | B2 * | 12/2023 | Gatke | A47G 29/16 |
| 11,896,151 | B2 * | 2/2024 | Myrick | A47G 29/30 |
| 2019/0264485 | A1 * | 8/2019 | Marykuca | E05D 15/44 |
| 2021/0038004 | A1 | 2/2021 | Graña Domínguez | |
| 2021/0045564 | A1 | 2/2021 | Duckers et al. | |
| 2021/0363816 | A1 * | 11/2021 | Daniels | E06B 7/34 |
| 2023/0308903 | A1 | 9/2023 | Kim et al. | |

* cited by examiner

FOLDING SUPPORT DEVICE FOR SMART DOORS

CROSS REFERENCE TO RELATED APPLICATIONS

The present application is the U.S. national phase application of, and claims the benefit of and priority to, International (PCT) Patent Appl. No. PCT/ES2022/070427, filed internationally on Jul. 4, 2022, which itself claims priority to Spanish Patent Appl. U2021131435, filed on Jul. 8, 2021. The entire disclosure of each of these applications is incorporated by reference as if set forth in their entirety herein.

TECHNICAL FIELD OF THE INVENTION

The present invention relates to a hinged support device for smart doors, which has application in the home automation industry, and more specifically in the field of smart doors that allow the automated enabling of an opening for the deposit of parcels by a courier.

Background to the Invention

Nowadays, with the implementation of e-commerce, it is common to send goods purchased by courier services, which raises the need to be present at the destination location at the time of delivery, given that the impossibility of being present at the time of delivery generates a series of inconveniences such as having to arrange delivery at another time, having to pick up the package at a collection point, having to arrange another delivery point or having to locate a third person to take charge of the reception. All these inconveniences are particularly sensitive for people who regularly shop online and who, for various reasons, are not usually at home and cannot have a third person to take care of the reception of the purchased products.

In order to overcome the problems generated in these situations, there are intelligent doors, which enable means to facilitate the delivery of parcels by the courier in the absence of a person in charge of their reception. For this purpose, the courier has a code that enables the activation of these means, which usually comprise an opening with automated closing means that are activated with the aforementioned code, so that the courier can deposit the package through the opening inside the home without the intervention of the addressee being required.

In addition, the intelligent doors have support means the package whose activation is synchronised with that of the means of closing the opening. These support means have deployable means at the time of delivery to allow the courier to place the package on them. When not in use, the support means are folded down so that they interfere as little as possible with the space near the inside face of the door.

The main aspect that can be improved in today's smart doors is the integration of the support means in the door itself, as well as the volume that these means occupy in the door. In many cases, these are complex mechanisms that require a large number of parts to be deployed and folded down, taking up quite a lot of space, in some cases outside the door and added to its inner face, which leads to space problems for the user even when the support means are folded down. Moreover, given their weight, including the driving means to produce their activation, not all doors are strong enough to allow their installation. Furthermore, a direct consequence of the complexity of these mechanisms is their cost and the difficulty involved in repairing them, in the event of breakage, and their maintenance.

DESCRIPTION OF THE INVENTION

The present invention relates to a hinged support device for smart doors, as defined in claim 1, which provides a very simple mechanism that occupies a very small volume, allowing it to be integrated inside the door, so that in its inactive position the device does not protrude from the edge of the door. Likewise, given its simplicity, the cost, maintenance and repair of the device are very low.

The device proposed by the invention, which may also be called a motorised hinge, can be housed inside a door leaf (A). The device comprises a folding element which can rotate between an inactive position, in which the folding element is contained inside the door leaf (A), and an active position, in which the folding element is deployed at a right angle to the inactive position, i.e. in a position substantially transverse to the plane of the door leaf (A).

Furthermore, the device comprises a fastening element which is fixed to the inside of the door leaf (A), preferably to the inside of the outer side of the door leaf (A), and to which the folding element is hinged at a first hinge point, so that the said fastening element serves as a support for the elements comprising the device.

Furthermore, the device comprises driving means, housed inside the door leaf (A), either fixed in the same way as the fastening element or fixed to it, so that the driving means act on the folding element to produce its rotation.

According to the invention, the driving means comprise a rod which can move linearly, in the plane of the door leaf (A) itself, preferably in a vertical direction, between two extreme positions defining the inactive and active positions. The driving means may consist of an electric motor.

The free end of the stem is connected to a first end of a first transmission element, the second end of which is hinged at a second hinge point to a first end of a second transmission element, the second end of which is hinged at a third hinge point to a middle section of the folding element.

Considering this mechanism, the linear movement of the second hinge point is limited by a first guide comprising the fastening element whose direction is parallel to the direction of movement of the drive rod.

In this way, the linear movement of the piston rod causes the first transmission element to move in the same direction, which in turn causes the second transmission element to move in the same direction, which in turn causes the folding element to unfold like a scissor mechanism.

As mentioned above, the device can be perfectly adapted to a very small space, which enables its use in any type of door, allowing a 90° angle deployment in such a small space and being able to support loads of up to 100 kg.

For a better spatial integration of the device, it is envisaged that the first transmission element comprises a second guide whose direction is parallel to the direction of movement of the drive shaft and which contains the first hinge point.

It is envisaged that the device may comprise a support element which is hinged to the free end of the hinged element at a third guide comprising the support element, so that the device may incorporate a shelf element, sized as required by its user, fixed to the said support element of the hinged element.

It is also envisaged that the first transmission element comprises a protrusion which, in the inactive position, acts on a switch of activation means of the device. In this way, the switch acts as a limit switch to indicate to an electronic board, which manages the automated operation of the device, the position or state of the folding element, i.e. whether it is active or inactive.

DESCRIPTION OF THE DRAWINGS

To complement the description being made and in order to assist in a better understanding of the features of the invention, in accordance with a preferred example of a practical embodiment thereof, a set of drawings is attached hereto as an integral part of the said description, in which the following is illustratively and non-limitingly depicted.

PREFERRED EMBODIMENT OF THE INVENTION

Figure 4:
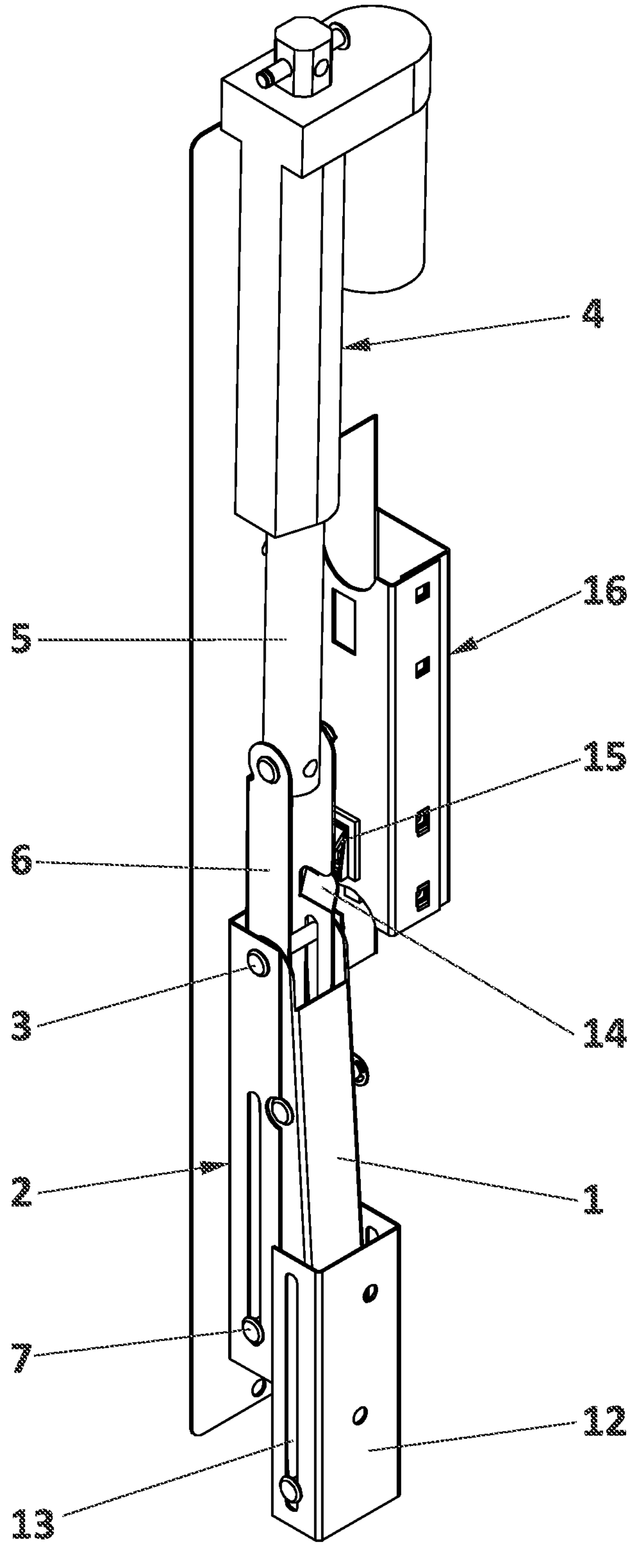
FIG. 4.—Shows a perspective view of the device in the inactive position.
Figure 5:
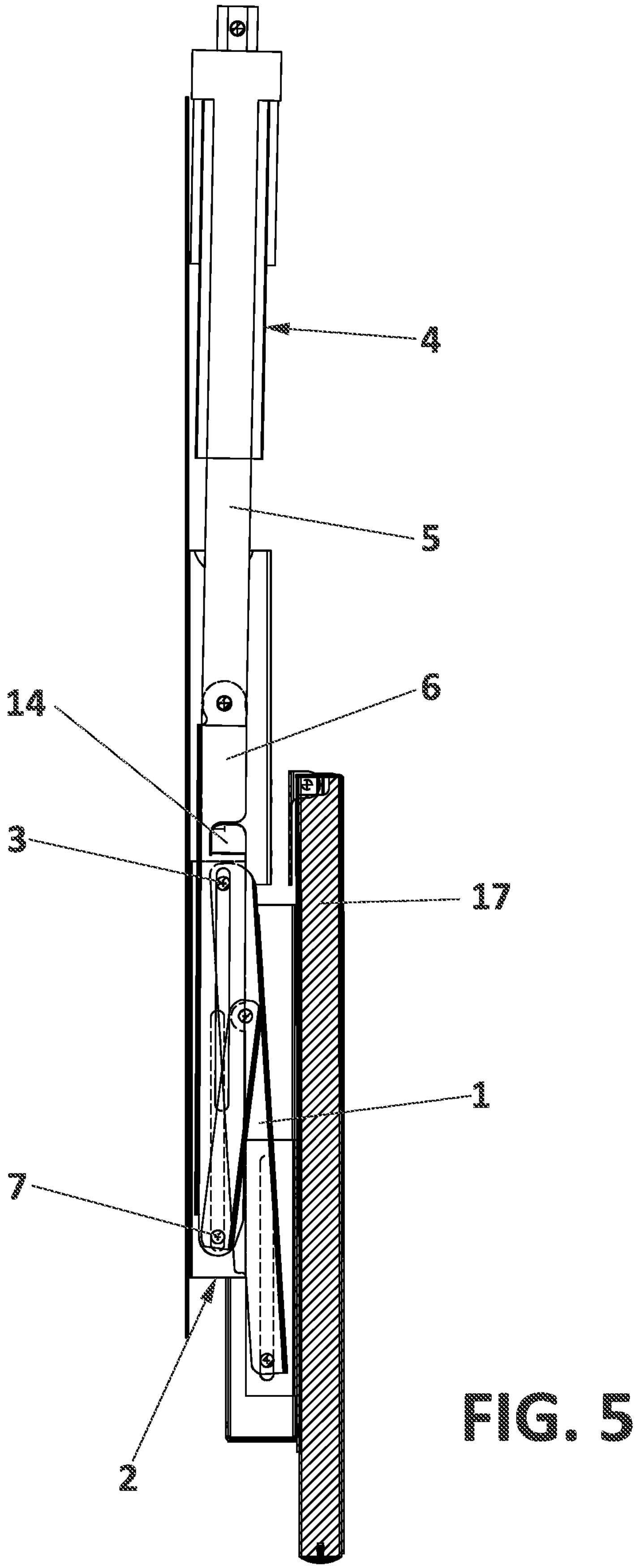
FIG. 5.—Shows a longitudinal section of the device in the inactive position.
Figure 7:
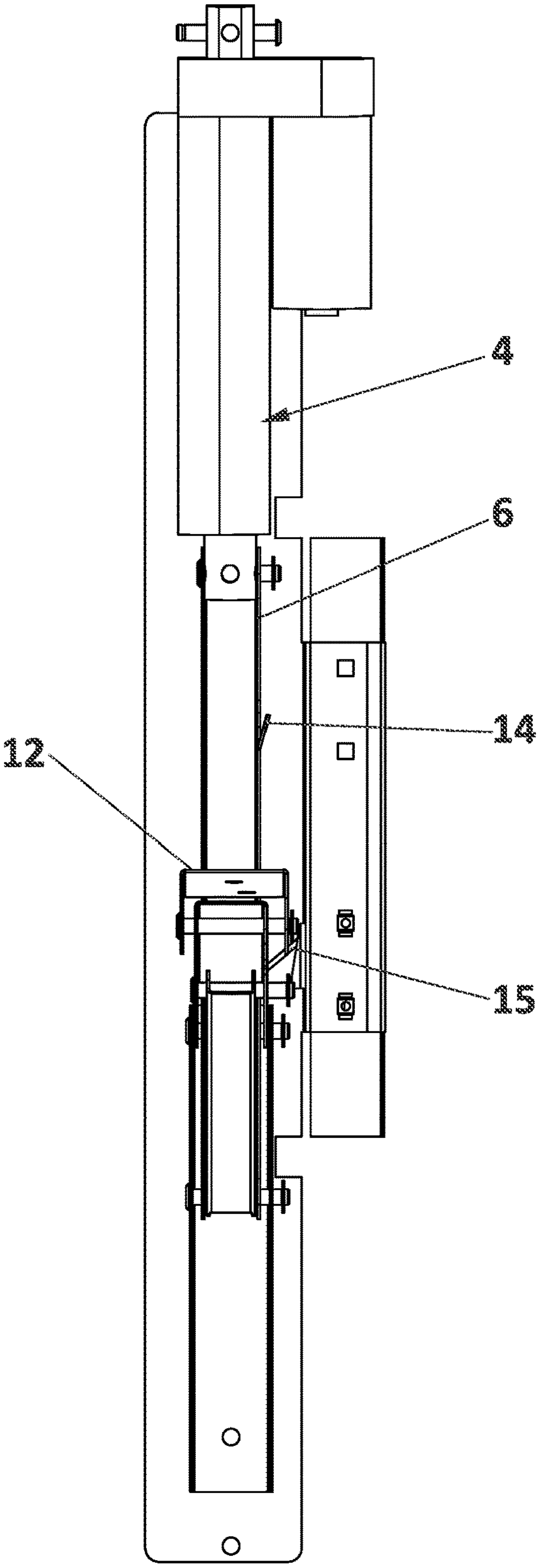
FIG. 7.—Shows a front view of the device in the active position.
Figure 8:
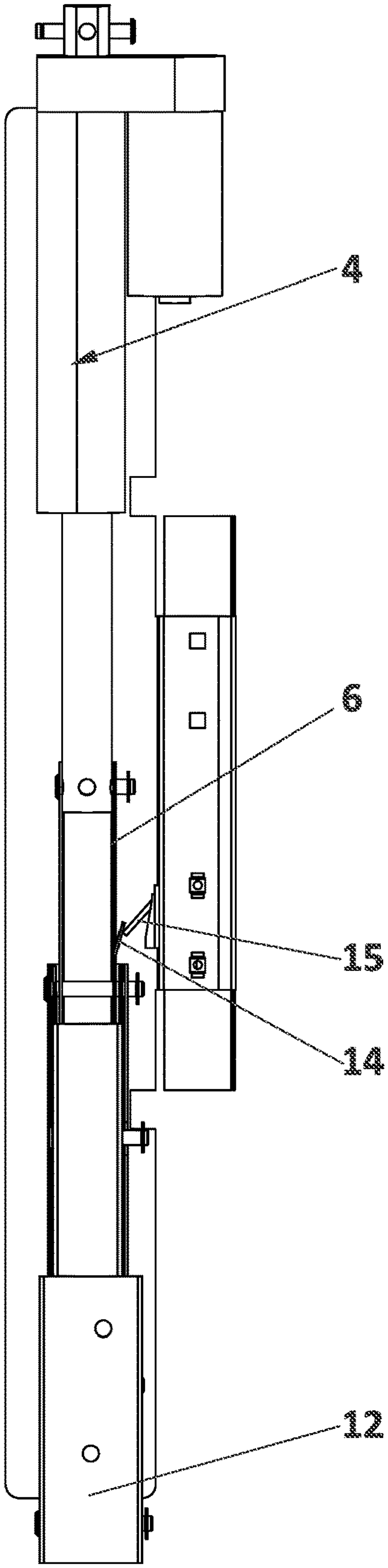
FIG. 8.—Shows a front view of the device in the inactive position, where the contact between the activation means and the switch can be seen.

In view of the figures shown, it can be seen how in one of the possible embodiments of the invention the device proposed by the invention comprises a folding element (1) which can rotate between an inactive position, shown in FIGS. 4, 5 and 8, in which said folding element (1) is contained inside the door leaf (A), and an active position, shown in FIGS. 1, 2, 3 and 7, in which said folding element (1) is deployed at a right angle to the door leaf (A), and an active position, shown in FIGS. 1, 2, 3 and 7, in which the folding element (1) is deployed at a right angle to the inactive position, in a position substantially transverse to the plane of the door leaf (A), preferably at an angle slightly greater than 90° to prevent the packages from slipping and falling.

The positioning of the device on the door is such that it is below and accessible from the opening through which the courier leaves the parcel after opening a sliding door of that opening.

The device comprises a fastening element (2) which is fixed to the inside of the external side of the door leaf (A) and to which the folding element (1) is hinged at a first hinge point (3). According to the embodiment shown, the fastening element (2) consists of a U-shaped profile.

The device also comprises driving means (4), consisting of an electric motor housed inside the door leaf (A), which comprise a rod (5) that can move linearly, in the plane of the door leaf (A) itself, in a vertical direction, between two extreme positions that define the inactive and active positions. In the embodiment shown, as can be seen in FIGS. 7 and 8, the inactive position coincides with the position of maximum deployment of the rod (5), so that to move to the active position, the rod (5) retracts.

The free end of the rod (5) is connected to a first end of a first transmission element (6) whose second end is hinged, at a second hinge point (7), to a first end of a second transmission element (8) whose second end is hinged, at a third hinge point (9), to a middle section of the folding element (1). As can be seen in the figures, according to the embodiment shown, the transmission elements (6, 8) and the folding element (1) itself consist of flat bars or flat bars arranged in pairs.

Figure 1:
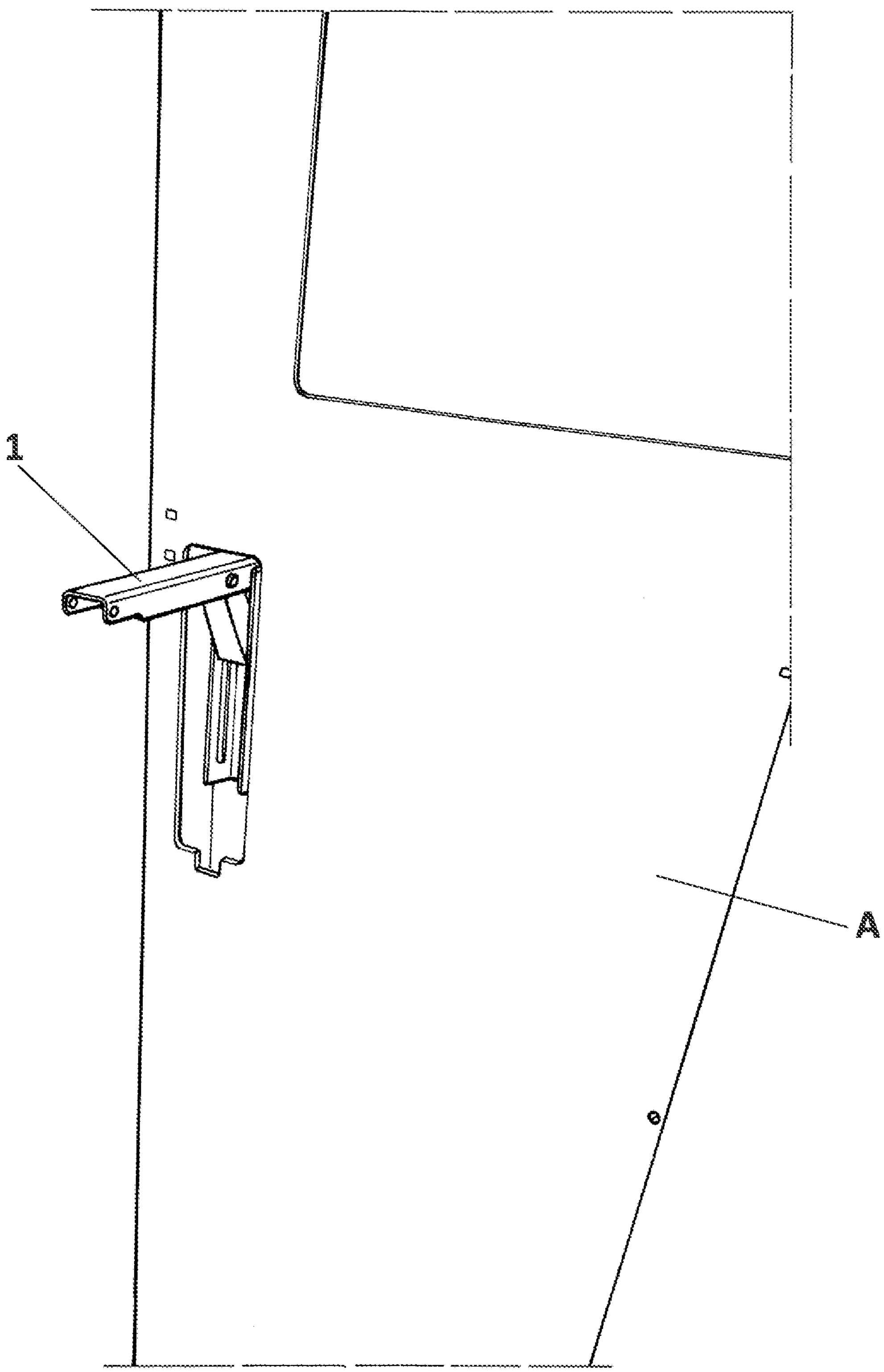
FIG. 1.—Shows a perspective view of the device of the invention mounted on a door in the active position, i.e. deployed.
Figure 2:
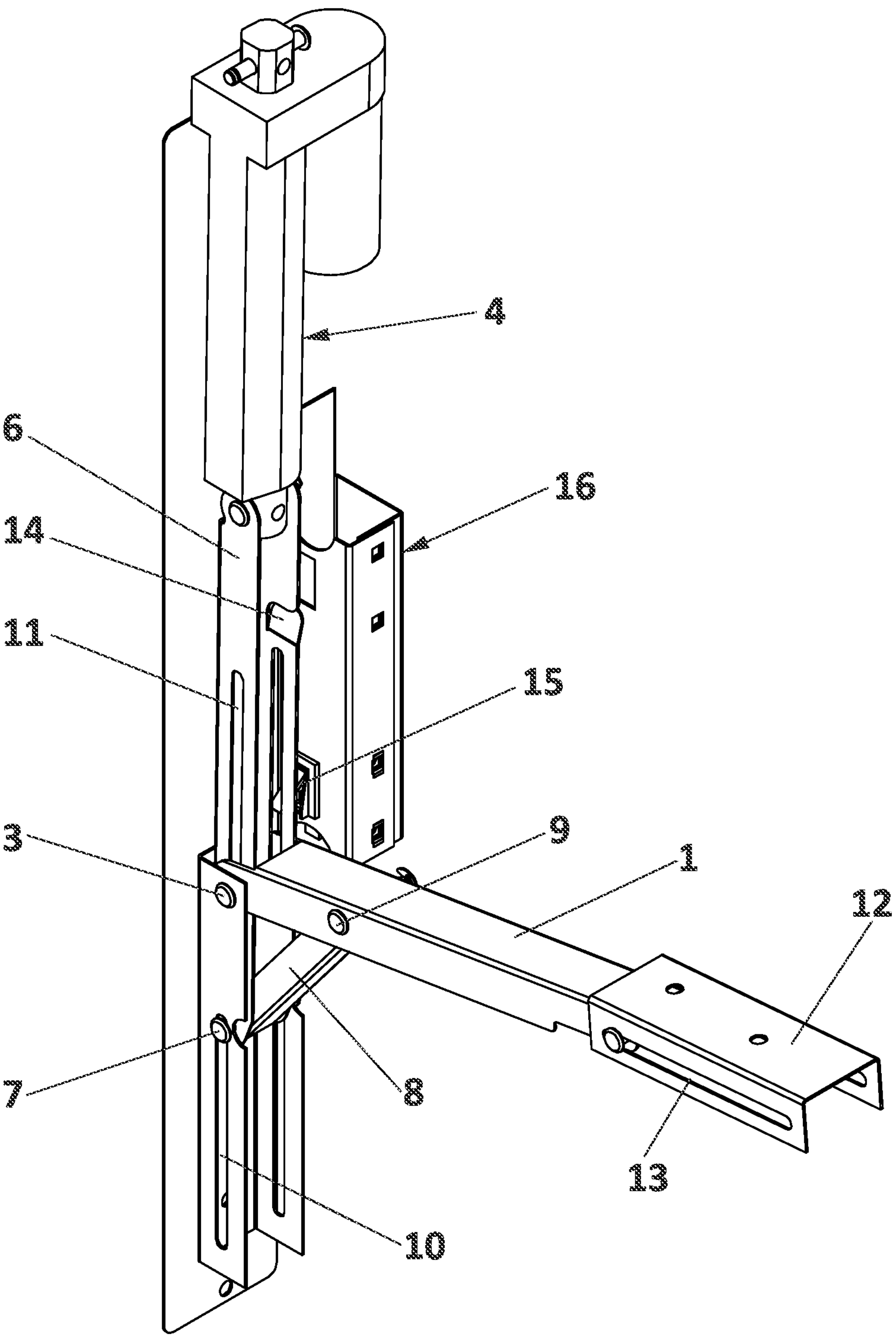
FIG. 2.—Shows a perspective view of the device in the active position without the door and shelf element.
Figure 3:
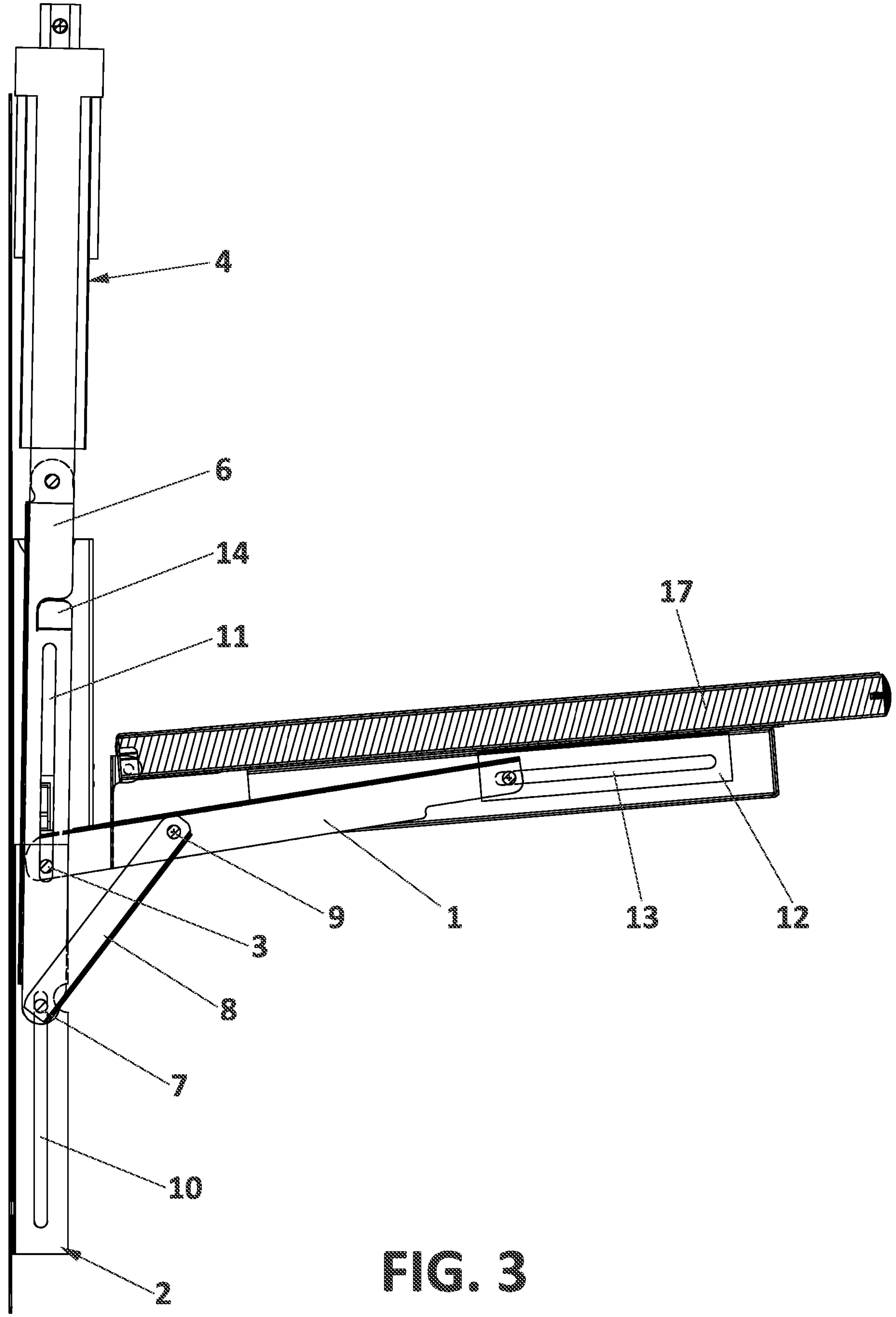
FIG. 3.—Shows a longitudinal section of the device in the active position and with the shelf element.

As shown in FIGS. 2 and 4, the linear movement of the second hinge point (7) is limited by a first guide (10) comprising the fastening element (2), the direction of which is parallel to the direction of movement of the rod (5) of the driving means (4).

In turn, the first transmission element (6) comprises a second guide (11) whose direction is parallel to the direction of movement of the rod (5) of the driving means (4) and which contains the first hinge point (3).

Figure 6:
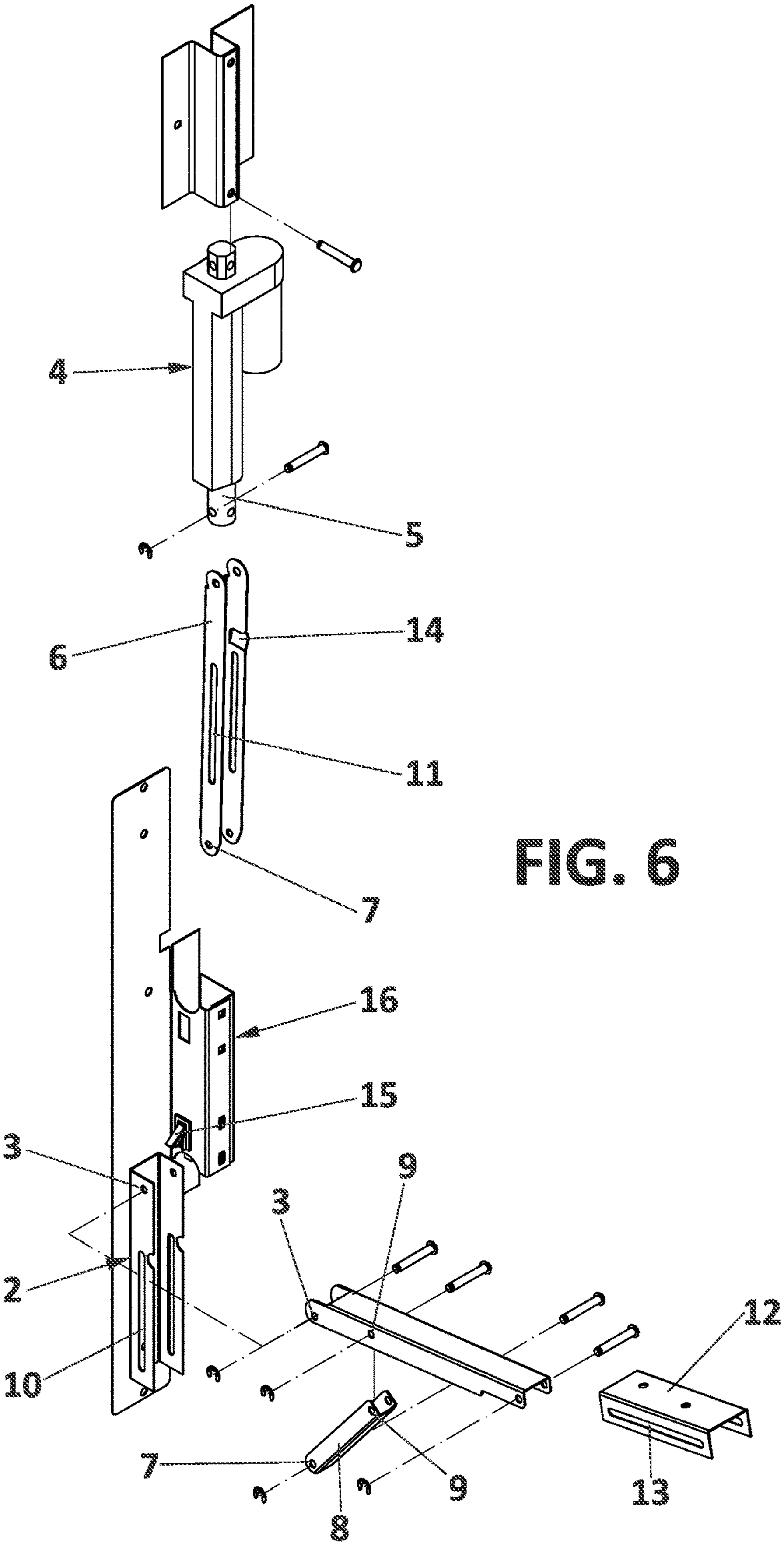
FIG. 6.—Shows an exploded view of all the elements of the device, with the exception of the shelf element.

The device comprises a support element (12), which in the embodiment shown in the figures consists of a U-shaped profile, particularly visible in FIGS. 2 and 6. This support element is hinged to the free end of the folding element (1) in a third guide (13) comprising the support element (12), so that the device can incorporate a shelf element (17), shown only in FIGS. 3 and 5, with the dimensions required by its user, fixed to the said support element (12) of the folding element (1).

As can be seen in particular in FIGS. 7 and 8, the first transmission element (6) comprises a projection (14) which in the inactive position acts on a switch (15) of activation means (16) of the device. In this way, the switch (15) acts as a limit switch to indicate to an electronic board, which manages the automated operation of the device, the position or status of the folding element (1), i.e. whether it is active or inactive.

In view of this description and set of figures, the person skilled in the art will understand that the embodiments of the invention that have been described can be combined in multiple ways within the subject matter of the invention. The invention has been described according to some preferred embodiments thereof, but it will be apparent to the person skilled in the art that multiple variations can be introduced into such preferred embodiments without exceeding the claimed subject matter of the invention.

The invention claimed is:

1. Hinged support device for doors, which can be housed inside a door leaf (A), comprising:

a folding element (1) that can rotate between an inactive position, in which the folding element (1) is contained within the door leaf (A), and an active position, in which the folding element (1) is at a right angle relative to the inactive position, a fastening element (2) including a first guide (10), wherein the fastening element (2) is fixed inside the door leaf (A) and is hinged to the folding element (1) at a first hinge point (3), and a driving means (4) housed inside the door leaf (A) and configured to act on the folding element (1) to cause it to rotate, wherein:

the driving means (4) comprises a rod (5) linearly movable between two extreme positions defining the inactive and active positions, wherein a free end of the rod (5) is connected to a first end of a first transmission element (6), and a second end of the first transmission element (6) is hinged at a second hinge point (7) to a first end of a second transmission element (8), and a second end of the second transmission element (8) is hinged at a third hinge point (9) to a middle section of the foldable element (1), where linear movement of the second hinge point (7) is limited by the first guide (10) in a direction that is parallel to the direction of movement of the rod (5) of the driving means (4).

2. The hinged support device of claim 1, wherein the first transmission element (6) comprises a second guide (11) whose direction is parallel to the direction of movement of the rod (5) of the driving means (4) and which contains the first hinge point (3).

3. The hinged support device of claim 1, further comprising a support element (12) hinged to a free end of the folding element (1) in a third guide (13).

4. The hinged support device of claim 1, wherein the first transmission element (6) comprises a projection (14) which, while the folding element is in the inactive position, acts on a switch (15) of activation means (16) of the device.

* * * * *